United States Patent [19]

Takata et al.

[11] Patent Number: 5,334,272
[45] Date of Patent: Aug. 2, 1994

[54] METHOD FOR PRODUCING AN EASILY OPENABLE CONTAINER

[75] Inventors: Yukio Takata; Takeshi Shinohara, both of Himeji, Japan

[73] Assignee: Idemitsu Petrochemical Co., Ltd., Tokyo, Japan

[21] Appl. No.: 915,669

[22] Filed: Jul. 21, 1992

Related U.S. Application Data

[62] Division of Ser. No. 713,497, Jun. 12, 1991, Pat. No. 5,167,339.

[30] Foreign Application Priority Data

Jun. 15, 1990 [JP] Japan ................................ 2-155280

[51] Int. Cl.$^5$ .......................... B65B 7/28; B32B 31/20
[52] U.S. Cl. ..................................... 156/69; 156/268; 156/292; 156/308.4
[58] Field of Search ................ 220/260, 359, 276, 270; 156/69, 224, 293, 308.4, 268, 292; 53/412, 420, 453, 477–478, 484–485; 229/123.1, 125.35

[56] References Cited

U.S. PATENT DOCUMENTS 4,605,142  8/1986  Itoh et al. ............................ 220/359

FOREIGN PATENT DOCUMENTS 0001094  3/1979  European Pat. Off. .
0241016  10/1987  European Pat. Off. .
0305976  3/1989  European Pat. Off. .
0349009  1/1990  European Pat. Off. .
63-307072  12/1988  Japan .

Primary Examiner—Caleb Weston
Assistant Examiner—Richard Crispino
Attorney, Agent, or Firm—Antonelli, Terry, Stout & Kraus

[57] ABSTRACT

An easily openable container comprises (a) a multilayer container body which includes an innermost layer and an adjacent layer contacting the innermost layer, a recessed portion and a flange and (b) a lid member melt sealed to the innermost layer of the multilayer container body at the flange, where the innermost layer and the adjacent layer are peelable from each other and having between them a peel strength smaller than the peel strength between the lid member and the innermost layer. The flange has two circular notches made in the innermost layer, and the multilayer container body and the lid member are melt sealed between the two circular notches, with the proviso that a portion of the melt sealed area projects outwardly from the outer circular notch, and a depression is made in the innermost layer at the outermost edge of the projecting portion of the melt sealed area by pressing the innermost layer through the lid member. Opening is performed by the peeling off the innermost layer together with the lid member from the adjacent layer of the multilayer container body between the two circular notch and begins easily by breaking the innermost layer at the depression at the outermost edge of the projecting portion of the melt sealed area.

5 Claims, 3 Drawing Sheets

METHOD FOR PRODUCING AN EASILY OPENABLE CONTAINER

This application is a Divisional application of Ser. No. 713,497, filed Jun. 12, 1991 now U.S. Pat. No. 5,167,339.

BACKGROUND OF THE INVENTION (a) Field of the Invention

The present invention relates to an easily openable container which is suited for food packaging, especially, for retort sterilization and to the method of producing the easily openable container.

(b) Description of the Related Art

The most conventional containers for packaging food include a lid member and a container body having a flange, where the container body is melt sealed with the lid member at the flange. In a conventional method of imparting both easy openability and sealability to the containers, a multilayer container body having an interlaminar strength smaller than the peel strength between the flange and the lid member is used and a notch is made in the sealing layer of the multilayer container body between the sealed area and the inner edge of the flange so that the opening of the container is performed by the peeling of the sealing layer between the outer edge and the flange to the notch. The method caused a demand for the increase of the stiffness of the flange, for example, by providing a skirt to the flange of a tray-shaped container.

Opening of the containers including a skirted flange required partial removal of the skirted flange at the portion for beginning opening, which was performed by corner-cutting or punching of the skirted flange. For example, in Japanese Patent Application Kokai Koho (Laid-open) Nos. 2-19280 and 2-98560 disclosed are easily openable containers whose flanges have at the flange a hole for facilitating the beginning of opening from the hole, and the hole is made by punching the flange of a sealed container at the portion for beginning opening or by sealing a container body and a lid each having a hole at the portion for beginning opening. There is, however, a problem that the method needs a punching step which complicates the processing procedures, the stiffness of the flange is decreased and, further, the appearance of the obtained container is deteriorated. In Japanese Patent Application Kokai Koho (Laid-open) No. 63-307072 disclosed is an easily openable container where a circular depression is made in the sealing layer of the container body at the outer periphery of the melt sealed area by pressing the innermost layer through the lid member at the time of melt sealing, thereby facilitating beginning of opening from the circular depression. In Japanese Patent Application Kokai Koho (Laid-open) No. 63-307073 disclosed is an easily openable container where two circular depressions are made in the sealing layer at both the outer and inner periphery of the melt sealed area in the same manner as in the method of Japanese Patent Application Kokai Koho (Laid-open) No. 63-307072. These methods also involve a problem that opening of the easily openable containers needs the breaking of the sealing layer at the circular depressions in the whole circumference of the flange, which causes a problem of a bad appearance at the broken portion of the sealing layer, such as beard-like breaking line. Further, the easily openable container disclosed in Japanese Patent Application Kokai Koho (Laid-open) No. 63-307073 involves another problem that it has a poor strength to internal pressure since there is no space between circular depression at the inner periphery of the melt sealed area and the melt sealed area, and if the sealing is made strongly to increase the strength to internal pressure, openability is decreased.

SUMMARY OF THE INVENTION

An object of the present invention is to provide an easily openable container which is easy to open and easy to provide a portion for beginning opening, has a high strength to internal pressure, and is free from the decreases in the stiffness of flange, in the deterioration of the appearance of the shape of flange and in the deterioration of the appearance owing to the beard-like breaking line at the sealed area after opening.

Another object of the present invention is to provide a suitable method of producing the easily openable container.

As the result of researches for attaining the above objects, the inventors found that a packaging container which is excellent in appearance, the stiffness of flange and easy openability can be obtained by melt sealing a lid to a multilayer container the flange of which has circular notches for opening so that the melt sealed area has a specific shape, and the finding led them to complete the present invention.

That is, the present invention provides an easily openable container, comprising:
 (a) a multilayer container body including an innermost layer, an adjacent layer contacting the innermost layer, a recessed portion having an open end. a flange extending circularly and outwardly from the open end of the recessed portion and
 (b) a lid member which is melt sealed to the innermost layer of the multilayer container body at the flange,
wherein the innermost layer and the adjacent layer of the multilayer container body are peelable from each other, the peel strength between the innermost layer and the adjacent layer is smaller than the peel strength between the lid member and the innermost layer of the multilayer container body, the flange has a first circular notch and a second circular notch which are made in the innermost layer and the second circular notch is located radially outside the first circular notch, the multilayer container body and the lid member are melt sealed between the first circular notch and the second circular notch, with the proviso that a portion of the melt sealed area projects outwardly from the second circular notch to provide a portion for beginning opening of the easily openable container, and the innermost layer has a depression at the outermost edge of the projecting portion of the melt sealed area, the depression in the innermost layer being made by pressing the innermost layer through the lid member.

The easily openable container of the present invention may be produced by a method which comprises grooving a multilayer container body including an innermost layer,
 an adjacent layer contacting the innermost layer, the innermost layer and the adjacent layer being peelable from each other,
 a recessed portion having an open end and
 a flange extending circularly and outwardly from the open end of the recessed portion so that the flange has a first circular notch and a second circular notch which are made in the innermost layer, and the second circular notch is located radially outside the first circular notch;

melt sealing a lid member to the innermost layer of the multilayer container body at the flange between the first circular notch and the second circular notch so that the peel strength between the lid member and the innermost layer of the multilayer container body is larger than the peel strength between the innermost layer and the adjacent layer of the multilayer container body, and a portion of the melt sealed area projects outwardly from the second circular notch to provide a portion for beginning opening of the easily openable container; and making a depression through the lid member in the innermost layer at an outermost edge of the projecting portion of the melt sealed area at the same time the lid member is melt sealed to the multilayer container body.

THE PREFERRED EMBODIMENTS OF THE INVENTION

Figure 1:
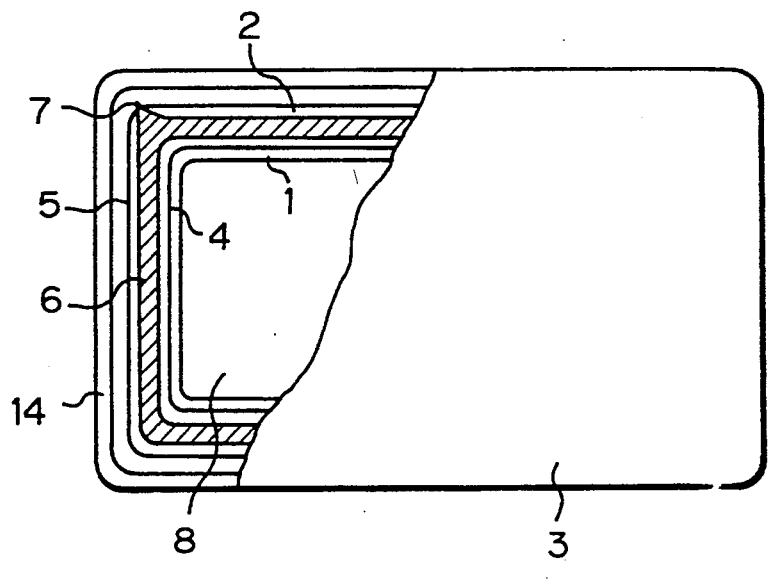
FIG. 1 is a partially cutaway plan view of the easily openable container of an embodiment according to the present invention.

Hereinafter, the present invention will be described referring to the drawings.

FIG. 1 is a partially cutaway plan view of the easily openable container of an embodiment according to the present invention, where a reference numeral 1 represents a multilayer container body having a flange 2 and a recessed portion 8, and a first circular or circumferential notch 4 and a second circular or circumferential notch 5 are made at the flange 2. The flange 2 is a skirted flange having a skirt 14. A lid member 3 and the flange 2 are melt sealed together between the first circular notch and the second circular notch, to form a zonal melt sealed area 6. In consideration of the stiffness, the preferred thickness of the flange 2 of the multilayer container body 1 is generally 4 to 20 mm, preferably 6 to 15 mm. The flange may optionally have a tab portion for facilitating opening. The notches may be made by a physical means using a notching blade or a cutting blade, a heating means such as melt cutting using heat waves (impulse) or a heated blade, a mechanical vibration means using ultrasonic waves or an internally exothermic means using high frequency waves. Although each of the notches may have an end within the innermost layer without penetrating into the adjacent layer of the multilayer container body, it is preferable that the notch penetrates to the adjacent layer to ensure the peeling of the innermost layer. The notches which extend circularly or circumferentially at the flange do not necessarily have to extend along whole the circumference of the flange so far as they extend circularly or circumferentially along the predetermined part to be opened.

Figure 2:
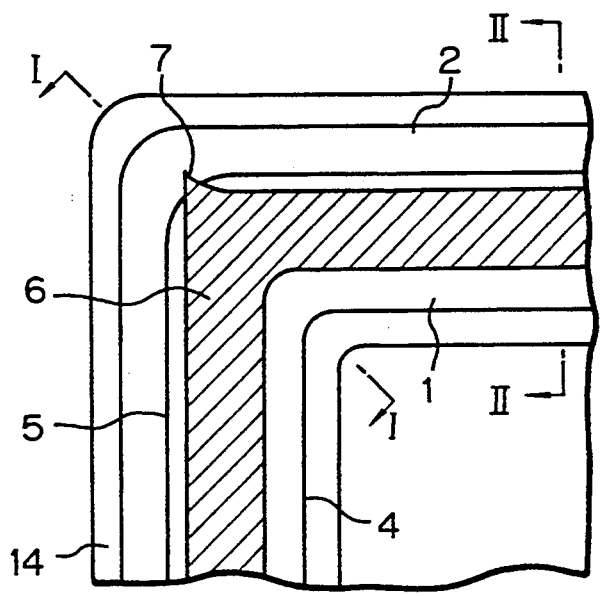
FIG. 2 is a partially enlarged plan view of the easily openable container of FIG. 1.

FIG. 2 is a partially enlarged view of a corner of the easily openable container of FIG. 1 where opening is to be begun. The melt sealed area 6 has a projecting portion 7 which projects outwardly from the second circular notch 5 at the part for beginning opening. The projecting portion is preferably at most 20 mm in width and at most 10 mm in length. It is preferable that the projecting portion is made narrower toward the top of the projecting portion. More preferably, the projecting portion is 5 to 10 mm in width and 2 to 5 mm in length. If the size of the projecting portion is too large, openability will be decreased.

Figure 3A:
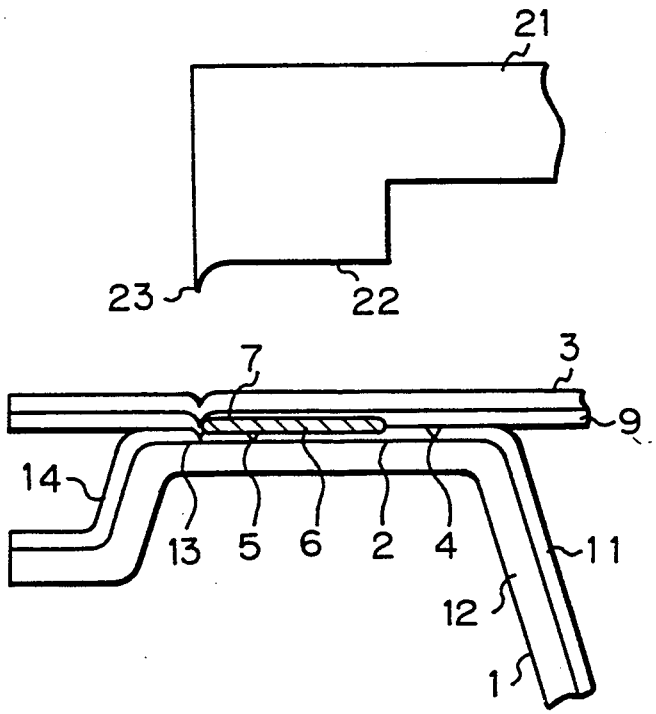
FIG. 3(a) and FIG. 3(b) are views showing the sections of the easily openable container of FIG. 2 taken along the line I—I and the line II—II of FIG. 2, respectively.
Figure 3B:
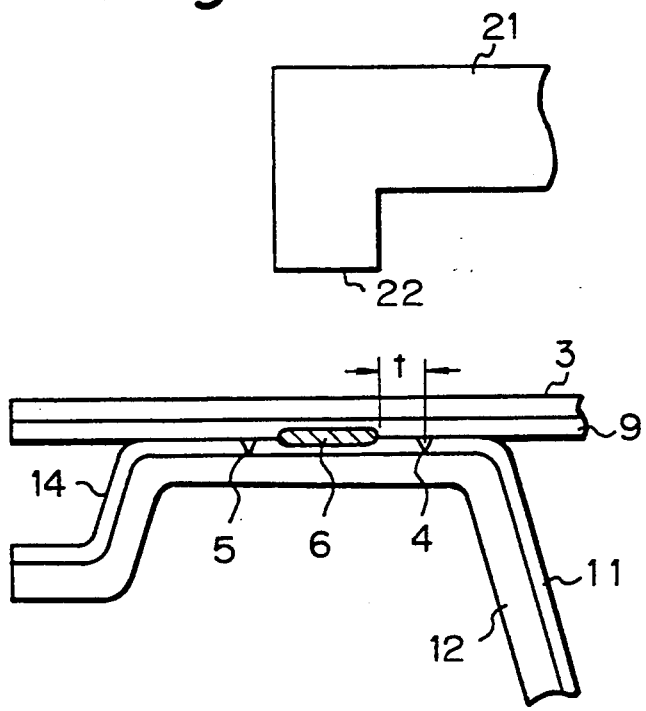

FIG. 3(a) is a view showing the section of the easily openable container of FIG. 2 taken along the line I—I, and FIG. 3(b) is a view showing the section of the easily openable container of FIG. 2 taken along the line II—II. The multilayer container body 1 is constituted by a two-layer sheet consists of an innermost layer 11 and an adjacent layer 12 contacting thereto which are peelable from each other. The lid member 3 is constituted by a two-layer sheet consisting of a base layer 10 and a sealant layer 9. The peel strength between the innermost layer 11 and the adjacent layer 12 is smaller than the peel strength between the flange 2 and the lid member 3, namely the peel strength between the innermost layer 11 and the sealant layer 9. As shown in FIG. 3(b), except for the portion for beginning opening, the multilayer container body 1 and the lid member 3 are zonally melt sealed together between the two circular notches 4 and 5 to form a melt sealed area 6. The first circular notch 4 and innermost edge of the melt sealed area 6 are spaced to give an non-melt sealed area, and the space t is preferably 0.5 mm to 10 mm. As shown in FIG. 3(a), the melt sealed area 6 has a projecting portion 7 projecting outwardly from the second circular notch 5 at the part for beginning opening, and a depression 13 is made in the innermost layer 11 at the outermost edge of the projecting portion 7 of the melt sealed area 6. At the time of beginning of opening, opening starts from the depression 13 and proceeds along the second circular notch 5. Therefore, the second circular notch 5 does not necessarily have to be made under the projecting portion 7. The depression 13 may be made by carrying out melt sealing by the use of a sealing ring 21 having a plane face 22 and a partial projection 23 projecting from the outermost edge of the plane face 22. The height of the projection 23 of the sealing ring may be determined depending on the thickness of the innermost layer, the kinds of the resins used or the conditions of melt sealing and is generally 10 to 500 $\mu m$, preferably 20 to 300 $\mu m$. The flange of the multilayer container body 1 shown in FIG. 1, FIG. 2, and FIG. 3(a) and (b) is a skirted flange having a skirt portion 14.

The materials of the multilayer container body are not particularly limited, and some of the examples of the materials include a polyolefin, a polystyrene, a polyamide, a polyester, a polycarbonate or a mixture thereof or a mixture thereof with 5 to 70% by weight of a thermoplastic elastomer, an additive or an inorganic filler, and metal foil. A combination of layers having a desired peel strength therebetween may be made by selecting a proper material for each layer from the above examples.

It is preferable that the materials of the innermost layer and the adjacent layer of the multilayer container body and the lid member have excellent strength and high heat resistance.

The preferred examples of the combination of the material (a) of the innermost layer and the material (b)

of the adjacent layer include the followings, but are not limited to them.

(a) a polyethylene such as a high density polyethylene or a low density polyethylene and (b) a resin mixture of a polypropylene and a polyethylene, (a) a polypropylene and (b) a resin mixture of a polypropylene and a polyethylene, (a) a low density polyethylene and (b) a high density polyethylene.

(a) an ethylene-vinyl acetate copolymer and (b) a resin mixture of polypropylene and a polyethylene, (a) an ethylene-vinyl acetate copolymer and (b) an ethylene-propylene random copolymer.

(a) a polypropylene or a resin mixture of a polypropylene and a polyethylene and (b) a resin mixture of an inorganic filler-containing polypropylene and a polyethylene, (a) a resin mixture of a polypropylene and a polyethylene and (b) an inorganic filler-containing high density polyethylene, (a) a homopolypropylene or a propylene random copolymer and (b) an inorganic filler-containing high density polyethylene, (a) an unsaturated carboxylic acid-modified polypropylene and (b) aluminum.

The multilayer container body may consists of two layers of the above materials or may consists of three or more layers which include at least a layer of some other material other than above materials on the purpose of improving gas barrier property or preventing deformation of the obtained containers. Some examples of the materials other than the above include materials having excellent gas barrier property, including resins having excellent gas barrier property, such as an ethylene-vinyl alcohol copolymer, a polyvinylidene chloride, a nylon (a polyamide), or a polyethylene terephthalate, or a metal, such as aluminum deposition layer, aluminum or iron. The layer of some other material may consists of one layer or a multilayer sheet consisting of two or more layers or a resin layer containing 10 to 80% by weight of an inorganic filler.

The multilayer structure of the multilayer container body is determined depending on the resin of the sealant layer of the lid member. It is preferable that the material of the innermost layer is the same kind of a resin material as that of the sealant layer of the lid member. For example, when the lid member has a sealant layer of a polyethylene, the preferred above combinations of materials are those where the material of the innermost layer of the container body is a high density polyethylene.

According to demand, the multilayer container body may have on the innermost layer another layer, such as a sealing layer, a heat resistant layer or an oilproof layer, provided that the multilayer container body can be delaminated between the innermost layer and the adjacent layer thereof. The multilayer container body may be produced by vacuum forming, pressure forming or draw forming by the use of a coextruded multilayer sheet obtained by coextruding the above resin materials or a laminate sheet obtained by laminating sheets of the above resins or may be produced by multilayer injection molding, multilayer injection blow molding or multilayer blow molding by the use of the above resin materials. Further, the multilayer container body may be produced by thermoforming a multilayer film on the inside of a container body of paper or the like.

The lamination may be carried out by extrusion lamination, dry lamination or hot melt lamination. A multilayer material having a desired interlaminar strength may be obtained by the above lamination using adhesives or pressure sensitive adhesives.

Although the lid member shown in FIG. 3 is a two-layer film, the structure of the lid member is not particularly limited and may also be a one-layer film or a multilayer film including two or more layers. When the lid member is constituted by a multilayer film, it is preferable that the lid member is constituted by a base layer and a sealant layer, the base layer being a one-layer film or a multilayer film of plastics materials, paper, aluminum foil or a composite layer thereof and the sealant layer being of a resin which is easy to melt seal to the innermost layer of the multilayer container body, such as a polyethylene, polypropylene, an ethylene-α-olefin copolymer and an ethylene-vinyl acetate copolymer.

The easily openable container of the present invention can be opened reliably and easily since the opening starts from the depression 13 made at the outermost edge of the projecting portion 7 of the melt sealed area 6 and does not require particular processing at the flange. After opening starts, it proceeds by the use of the circular notch 5, which enables opening of the container without forming beard-like breaking line and provides an opened container having excellent appearance. The method of producing the easily openable container according to the present invention enables to produce the easily openable container by a simple process without specific processing of the flange.

The present invention will be described in more detail with reference to the following Examples. These Examples, however, are not to be construed to limit the scope of the invention.

EXAMPLE 1 AND COMPARATIVE EXAMPLES 1 TO 4

EXAMPLE 1

The following multilayer sheet was formed by coextrusion molding.

innermost layer: a high density polyethylene (HDPE) layer, 100 μm (Trademark: IDEMITSU POLYETHYLENE 44M produced by Idemitsu Petrochemical Co., Ltd., density: 0.96 g/cm$^3$, MI: 0.9 g/10 min., molecular weight distribution: small)

adjacent layer: a polypropylene (PP) layer, 900 μm a resin mixture of 80% by weight of a polypropylene (Trademark: IDEMITSU POLYPRO E-100G produced by Idemitsu Petrochemical Co., Ltd., MI: 0.6 g/10 min.), 15% by weight of a low density polyethylene (Trademark: PETROTHEN 172 produced by Tosoh Co., Ltd., density: 0.92 g/cm$^3$, MI: 0.3 g/10 min.) and 5% by weight of a high density polyethylene (Trademark: IDEMITSU POLYETHYLENE 530 B produced by Idemitsu Petrochemical Co., Ltd.)

The multilayer sheet was formed into a flanged multilayer container body having a recessed portion of 150 mm × 100 mm × 30 mm (height) by plug assist vacuum forming.

The multilayer container body had a rectangular tray-like shape and had a flange of 8 mm in width extending outwardly from the open end of the recessed portion, and the flange had a skirt bent downwardly from the outermost edge of the flange.

Figure 4:
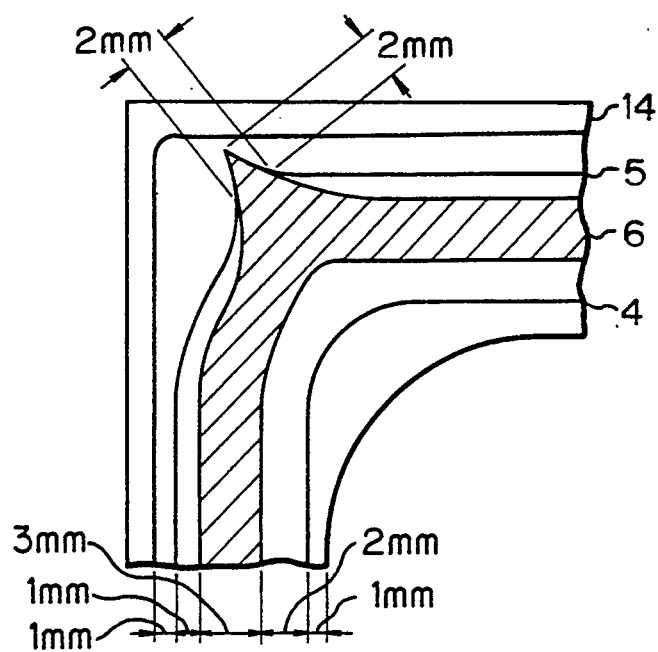
FIG. 4 is a partially enlarged plan view of a corner part of the easily openable container produced in Example 1.

Subsequently, a first circular notch 4 and a second circular notch 5 as shown in FIG. 4 were made into the innermost layer by the use of a heated blade. The two circular notches completely cut the innermost layer and were arranged with separation, distance 6 mm.

A lid member of a multilayer sheet consisting of a layer of an oriented nylon (15 μm), a layer of a polyvinylidene chloride (20 μm), a layer of an oriented nylon (15 μm) and a layer of a linear low density polyethylene (60 μm), in this order, was placed on the notched multilayer container body so that the layer of a linear low density polyethylene of the lid member and the innermost layer of the multilayer container body were in contact with each other at the flange, and the lid member and the multilayer container body were melt sealed once at the flange by the use of a heat-sealing ring under the conditions of a temperature of 195° C. a pressure of 3 kg/cm$^2$, a time of 2 seconds.

The melt sealing was carried out so that the lid member and the multilayer container body were sealed zonally at the flange between the two circular notches, the first circular notch and the innermost edge of the melt sealed area were spaced at a distance of 2 mm and the second circular notch and the outermost edge of the melt sealed area were spaced at a distance of 1 mm as shown in FIG. 4, and a part of the melt sealed area at the portion for beginning opening projected outwardly from the second circular notch. The projecting portion of the melt sealed area tapered off to a sharp point and projected 2 mm outwardly from the second circular notch, and the maximum width of the projecting portion was 2 mm. A part of the sealing ring corresponding to the projecting portion of the melt sealed area had, at the pointed edge thereof, a projection, which made, at the pointed edge of the melt sealed area, a depression of a depth of 90 μm in the innermost layer through the lid member.

COMPARATIVE EXAMPLE 1

A packaging container was produced by melt sealing the same lid member and the same multilayer container body at the flange between the first circular notch and the second circular notch with the proviso that no part of the melt sealed area was projected outwardly from the second circular notch, but a hole was made at a part of the flange where the second circular notch run through and opening was to begin.

COMPARATIVE EXAMPLE 2

A packaging container was produced in the same manner as in Comparative Example 1 with the proviso that no hole was made at the part of the flange to be the portion for beginning opening.

COMPARATIVE EXAMPLE 3

A packaging container was produced in the same manner as in Example 1 with the proviso that no circular notch was made in the innermost layer of the multilayer container body at the flange, but two circular depressions of 90 mm in depth were made in the innermost layer of the multilayer container body at the innermost edge and the outermost edge of the melt sealed area by carrying out melt sealing using a sealing ring which had two circular projections at the innermost edge and the outermost edge of the sealing plane thereof.

COMPARATIVE EXAMPLE 4

A packaging container was produced in the same manner as in Comparative Example 3 with the proviso that the thickness of the innermost layer made of a high density polyethylene was changed from 100 μm to 10 μm.

Table 1 shows the sealing strength, the initial opening strength, the opening strength and the interlaminar strength of each of tile packaging containers obtained in Example 1 and Comparative Examples 1 to 4, and Table 2 shows the results of performance tests.

"Sealing strength" means the peel strength between the lid member and the innermost layer of the multilayer container body.

"Initial opening strength" means the load required to begin opening of the melt sealed container.

"Opening strength" means the peel strength after the beginning of opening.

"Interlaminar strength" means the peel strength between the innermost layer and the adjacent layer of the multilayer container. The interlaminar strength was measured by peeling a test piece (width: 15 mm) of the multilayer sheet prepared in Example 1 between the HDPE layer and the PP layer (tensile speed: 300 mm/min., 180° peel).

Evaluation of easy openability was carried out by melt sealing a lid member to a multilayer container body, followed by peeling off the lid member from the sealed container. Containers having an initial opening strength of 1,200 g or less were valued as ◯, containers having an initial opening strength of 1,200 to 1,500 g were valued as Δ, and containers having an initial opening strength of more than 1,500 g were valued as x.

The stiffness of the flange was valued by clasping an area including the portion for beginning opening and observing the degree of deflection at the tab portion.

The strength to internal pressure was evaluated by injecting pressurized air into a sealed container and measuring the internal pressure at the time of breaking of the container.

| more than 0.6 kg/cm$^2$ | ◯ |
|---|---|
| 0.6 to 0.3 kg/cm$^2$ | Δ |
| less than 0.3 kg/cm$^2$ | x |

Processability was valued by the number of the processing steps between the thermoforming of a multilayer container body and the sealing of a lid member.

| none | one step | two steps | three steps or more |
|---|---|---|---|
| ⊙ | ◯ | Δ | x |

Evaluation of appearance was carried out before and after opening. The appearance before opening was valued by the uniformity of the shape of the flange. Containers having a hole at the flange were valued as "Slightly bad". The appearance after opening was valued by the amount and size of beard-like broken edge of the innermost layer at the flange.

| none-very small: ◯ | medium: Δ | large: x |
|---|---|---|

TABLE 1

|  | Example No. 1 | Comparative Example No. 1 | 2 | 3 | 4 |
|---|---|---|---|---|---|
| Sealing strength (kg/15 mm) | 5< | 5< | 5< | 5< | 5< |
| Initial opening strength (g) | 1,000 | 1,000 | 1,500 | 2,000 | 1,300 |
| Opening strength (g/15 mm) | 80 | 800 | 1,000 | 1,300 | 900 |
| Interlaminar strength (g/15 mm) | 800 | 800 | 800 | 800 | 800 |

All the strengths were measured by 180°-peeling at a speed of 300 mm/min.

TABLE 2

|  | Example No. 1 | Comparative Example No. 1 | 2 | 3 | 4 |
|---|---|---|---|---|---|
| Easy openability | ○ | ○ | x | x | △ |
| Stiffness of flange | ○ | △ | ○ | ○ | ○ |
| Strength to internal pressure | ○ | ○ | ○ | △ | x |
| Processability | ○ | △ | ○ | ⊙ | ⊙ |
| Appearance before opening | ○ | △ | ○ | ○ | ○ |
| Appearance after opening | ○ | ○ | x | x | △ |

What is claimed is:

1. A method of producing an easily openable container, comprising:

grooving a multilayer container body including an innermost layer, an adjacent layer contacting the innermost layer, the innermost layer and the adjacent layer being peelable from each other, a recessed portion having an open end and a flange extending circumferentially and outwardly from the open end of the recessed portion so that the flange has a first circumferential notch and a second circumferential notch which are made in the innermost layer, and the second circumferential notch is located radially outside the first circumferential notch;

melt sealing a lid member to the innermost layer of the multilayer container body at the flange between the first circumferential notch and the second circumferential notch to form a melt sealed area so that the peel strength between the lid member and the innermost layer of the multilayer container body is larger than the peel strength between the innermost layer and the adjacent layer of the multilayer container body, and a portion of the melt sealed area projects outwardly from the second circumferential notch to provide a portion for beginning opening of the easily openable container; and making a depression through the lid member in the innermost layer at an outermost edge of the projecting portion of the melt sealed area at the same time the lid member is melt sealed to the multilayer container body.

2. A method according to claim 1, wherein the projecting portion of the melt sealed area is made to be at most 20 mm in width and at most 10 mm in length.

3. A method according to claim 2, wherein the projecting portion of the melt sealed area is made narrower towards the outermost edge of the projecting portion.

4. A method according to claim 1, wherein the lid member comprises a multilayer sheet having a base layer and a sealant layer and wherein the sealant layer is melt sealed to the innermost layer of the multilayered container body, the peel strength between the sealant layer of the lid member and the innermost layer of the multilayer container body being larger than the peel strength between the innermost layer and the adjacent layer of the multilayer container body.

5. A method according to claim 4, wherein the sealant layer of the lid member is a polyethylene, the innermost layer of the multilayer container is a polyethylene and the adjacent layer of the multilayer container body is a resin mixture of a polypropylene and a polyethylene.

* * * * *